(12) United States Patent
Arnold

(10) Patent No.: US 10,569,561 B2
(45) Date of Patent: Feb. 25, 2020

(54) VALVES FOR FLUID EJECTION DEVICES

(71) Applicant: HEWLETT-PACKARD DEVELOPMENT COMPANY, L.P., Houston, TX (US)

(72) Inventor: Christopher John Arnold, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/074,913

(22) PCT Filed: Oct. 27, 2016

(86) PCT No.: PCT/US2016/059133
§ 371 (c)(1),
(2) Date: Aug. 2, 2018

(87) PCT Pub. No.: WO2018/080498
PCT Pub. Date: May 3, 2018

(65) Prior Publication Data
US 2019/0039382 A1 Feb. 7, 2019

(51) Int. Cl.
*B41J 2/175* (2006.01)
*B41J 2/18* (2006.01)
(Continued)

(52) U.S. Cl.
CPC ......... *B41J 2/17596* (2013.01); *B29C 64/209* (2017.08); *B33Y 40/00* (2014.12); *B41J 2/18* (2013.01); *B41J 29/02* (2013.01); *B41J 29/38* (2013.01); *F16K 11/185* (2013.01); *F16K 31/047* (2013.01); *F16K 31/52416* (2013.01)

(58) Field of Classification Search
CPC . B41J 2/17596; B41J 2/18; B41J 29/02; B41J 29/38; B33Y 40/00; B29C 64/209; F16K 11/185; F16K 31/047
See application file for complete search history.

(56) References Cited

U.S. PATENT DOCUMENTS 6,905,645 B2 6/2005 Iskra
6,989,115 B2 1/2006 Russell et al.
(Continued)

FOREIGN PATENT DOCUMENTS

WO 02076750 A1 10/2002

*Primary Examiner* — Juanita D Jackson
(74) *Attorney, Agent, or Firm* — HP Inc. Patent Department

(57) ABSTRACT

In some examples, a valve assembly for a fluid ejection device includes a plurality of valves to control fluid supply from a plurality of fluid sources to the fluid ejection device, each respective valve of the plurality of valves actuatable between a first valve position to provide fluid communication through a first fluid path between a first fluid source of the plurality of fluid sources and the fluid ejection device, and a second valve position to provide fluid communication through a second fluid path between a second fluid source of the plurality of fluid sources and the fluid ejection device. A common actuator, when energized, controls movement of the plurality of valves. Each respective biasing mechanism of a plurality of biasing mechanisms is to maintain the respective valve at each of the first valve position and the second valve position without energizing the common actuator.

15 Claims, 8 Drawing Sheets

(51) Int. Cl.

| | |
|---|---|
| *B41J 29/02* | (2006.01) |
| *B41J 29/38* | (2006.01) |
| *B29C 64/209* | (2017.01) |
| *F16K 31/524* | (2006.01) |
| *F16K 11/18* | (2006.01) |
| *F16K 31/04* | (2006.01) |
| *B33Y 40/00* | (2020.01) |

(56) References Cited

U.S. PATENT DOCUMENTS

| | | |
|---|---|---|
| 7,971,991 B2 | 7/2011 | Davidson et al. |
| 9,254,535 B2 | 2/2016 | Buller et al. |
| 2006/0061618 A1 | 3/2006 | Hernandez et al. |
| 2010/0220127 A1* | 9/2010 | Levy et al. ............. B41J 2/175 |
| 2012/0056952 A1 | 3/2012 | Silverbrook |
| 2014/0292952 A1* | 10/2014 | Uchiyama ............. B41J 2/1707 |
| 2015/0091990 A1 | 4/2015 | Shimizu |
| 2016/0368274 A1* | 12/2016 | Ohtsu et al. ......... B41J 2/17596 |

\* cited by examiner

VALVES FOR FLUID EJECTION DEVICES

BACKGROUND

A printing system can include a printhead that has nozzles to dispense printing fluid to a target. In a two-dimensional (2D) printing system, the target is a print medium, such as a paper or another type of substrate onto which print images can be formed. Examples of 2D printing systems include inkjet printing systems that are able to dispense droplets of inks. In a three-dimensional (3D) printing system, the target can be a layer or multiple layers of build material deposited to form a 3D object.

BRIEF DESCRIPTION OF THE DRAWINGS

Some implementations of the present disclosure are described with respect to the following figures.

DETAILED DESCRIPTION

Figure 1:
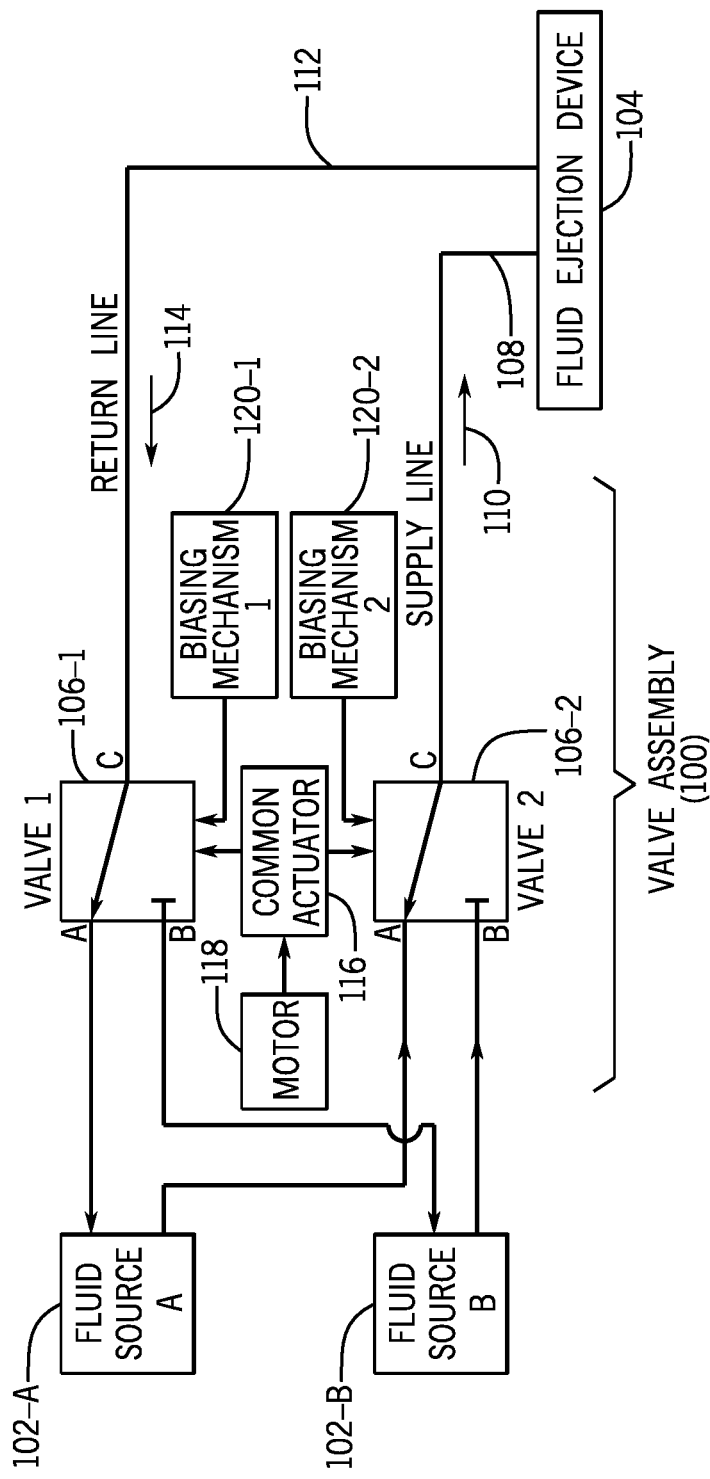
FIG. 1 is a block diagram of a fluid delivery system according to some examples.

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

A printhead is an example of a fluid ejection device that includes nozzles for ejecting a fluid onto a target. A printhead can be used in a printing system. A printing system can be a two-dimensional (2D) or three-dimensional (3D) printing system. A 2D printing system dispenses printing fluid, such as ink, to form images on print media, such as paper media or other types of print media. A 3D printing system may form a 3D object by forming successive layers of build material and selectively solidifying portions thereof. Printing fluids dispensed by the 3D printing system can include ink, as well as fluids used to selectively solidify build layers of build material, detail a layer of build material (such as by defining edges or shapes of the layer of build material), and so forth.

In the ensuing discussion, the term "printhead" can refer generally to a printhead die or an overall assembly that includes multiple printhead dies mounted on a support structure. Although reference is made to a printhead for use in a printing system in some examples, it is noted that techniques or mechanisms of the present disclosure are applicable to other types of fluid ejection devices used in non-printing applications that are able to dispense fluids through nozzles. Examples of such other types of fluid ejection devices include those used in fluid sensing systems, medical systems, vehicles, fluid flow control systems, and so forth.

A fluid delivery system for a printhead or another type of fluid ejection device can include a valve assembly that controls the flow of fluid through selected fluid paths. In some example systems, a valve assembly can be used to control the flow of fluid from multiple fluid sources. In such systems, valves of the valve assembly can be actuated between different positions by using a solenoid. To maintain the valve in a particular position, the solenoid is energized. However, if a system including the valve assembly were to lose power, then the solenoid would no longer be energized, and as a result, the state of the valve (i.e., the position of the valve) can be unknown and thus lead to an indeterminate operation of the system. Alternately, a valve assembly that loses power may return to an initial or default position, and thus would not be able to stay in a position different from the initial or default position if power is lost.

In accordance with some implementations of the present disclosure, a valve assembly that is part of a fluid delivery system can maintain valves of a valve assembly at each of multiple positions even if power is lost to a system in which the valve assembly is located. The valve assembly includes a common actuator that, when energized, actuates the valves of the valve assembly between different valve positions. Biasing mechanisms are provided to maintain the valves at a specific valve position even when the actuator is no longer energized.

FIG. 1 depicts an example fluid delivery system that includes fluid sources 102-A and 102-B, a valve assembly 100, and a fluid ejection device 104 according to some implementations of the present disclosure. The valve assembly 100 can selectively communicate fluid from a selected one of multiple fluid sources 102-A and 102-B to the fluid ejection device 104. In some examples, the fluid ejection device 104 is a printhead. In other examples, the fluid ejection device 104 can be used to dispense fluid in a non-printing application.

In some example applications, one of the fluid sources 102-A and 102-B can be a primary fluid source, while the other of the fluid sources 102-A and 102-B can be a backup fluid source to be used in response to the primary fluid source running low on fluid or in response to another issue associated with the primary fluid source.

In some examples, the fluid ejection device 104 can be implemented as an integrated circuit (IC) die that includes a substrate on which is provided nozzles and control circuitry to control ejection of a fluid by the nozzles. In other examples, the fluid ejection device 104 can include a structure (such as an ink cartridge) that has a fluid reservoir containing a fluid, fluid channels connected to the fluid reservoir, and a die or multiple dies including nozzles and control circuitry to control ejection of a fluid by the nozzles.

Assuming that the fluid source 102-A is the fluid source selected for use in the fluid delivery system, the valve assembly 100 can communicate fluid from the fluid source 102-A to the fluid ejection device 104. In response to an event, the valve assembly 100 can be actuated to select the fluid source 102-B instead of the fluid source 102-A, to cause fluid from the fluid source 102-B to be routed through the valve assembly 100 to the fluid ejection device 104. The event that can trigger a switch from the fluid source 102-A to the fluid source 102-B can be a low fluid event, in response to the system detecting that the fluid source 102-A is low on fluid (e.g., the amount of fluid in the fluid source 102-A is lower than a specified threshold). In other examples, other events can trigger the valve assembly 100 to switch from the fluid source 102-A to the fluid source 102-B, or vice versa.

The valve assembly 100 includes a first valve 106-1 and a second valve 106-2. Each valve 106-1 or 106-2 can be a three-way, two-position valve that has ports A, B, and C. In other examples, other types of valves can be used. The valves 106-1 and 106-2 are to control a supply of fluid from multiple fluid sources 102-A and 102-B to the fluid ejection device 104. Each valve 106-1 or 106-2 of the valve assembly 100 is actuatable between a first valve position (position A) to provide fluid communication through a first fluid path from the fluid source 102-A to the fluid ejection device 104, and a second valve position (position B) to provide fluid communication through a second fluid path between the fluid source 102-B and the fluid ejection device 104.

In FIG. 1, each valve 106-1 or 106-2 is set to position A, such that port A is fluidically connected to port C so that fluid can flow through the valve 106-1 or 106-2 between ports A and C. In position A as shown in FIG. 1, fluid from the fluid source 102-A is passed through the valve 106-2 to the fluid ejection device 104, along a supply line 108 in a direction indicated by arrow 110. Fluid can be ejected from the nozzles of the fluid ejection device 104. A portion of the fluid that is not ejected from the nozzles of the fluid ejection device 104 can be returned along a return line 112 in a direction indicated by arrow 114 back to the fluid source 102-A through the valve 106-1. Thus, as shown in FIG. 1, when the valves 106-1 and 106-2 are each set at position A, fluid flows between the fluid source 102-A and the fluid ejection device 104 along a first fluid path.

The common actuator 116 when energized controls movement of the valves 106-1 and 106-2. As depicted in FIG. 1, the valve assembly 100 includes a motor 118 that when activated is able to actuate the common actuator 116 to operate the valves 106-1 and 106-2. The motor 118 can be activated to energize the common actuator 116 to move the valves 106-1 and 106-2 from one position to another position. Energy can then be removed from the common actuator 116, and the valves 106-1 and 106-2 can stay at their respective positions.

The valve assembly 100 further includes multiple biasing mechanisms 120-2 and 120-1. Each respective biasing mechanism 120-2 or 120-1 is to maintain a respective valve at each of the first valve position (position A) and the second valve position (position B) without energizing the common actuator 116. More specifically, the biasing mechanism 120-1 is to maintain the valve 106-1 at each of position A and position B without having to energize the common actuator 116, and the biasing mechanism 120-2 is to maintain the valve 106-2 in each of position A and position B without having to energize the common actuator 116. In some examples, the biasing mechanisms 120-1 and 120-2 can cooperate with frictional forces in the motor 118 to maintain each valve at position A or position B. The frictional forces of the motor 118 are able to keep moveable member(s) of the motor 118 in position even though the motor 118 is deactivated.

In FIG. 1, although two fluid sources and two valves are shown, along with respective biasing mechanisms 120-2 and 120-1, it is noted that in other examples, more than two fluid sources can be provided, and/or more than two valves and respective biasing mechanisms can be provided.

When actuated by the motor 118, the common actuator 116 can change the position of each of valves 106-1 and 106-2 from position A to position B. In position B, port B is connected to port C in each valve 106-2 or 106-1. When the valves 106-1 and 106-2 are each set at position B, fluid from the fluid source 102-B is passed through the valve 106-2 through the supply line 108 to the fluid ejection device 104, and any remaining fluid is returned from the fluid ejection device 104 back over the return line 112 through the valve 106-1 to the fluid source 102-B. Thus, when the valves 106-1 and 106-2 are each set at position B, fluid flows between the fluid source 102-B and the fluid ejection device 104 along a second fluid path.

Although not shown in FIG. 1, it is noted that a pump can be provided along the supply line 108, or alternatively, along the return line 112. The pump is to cause movement of fluid along the supply line 108 or return line 112.

Figure 2A:
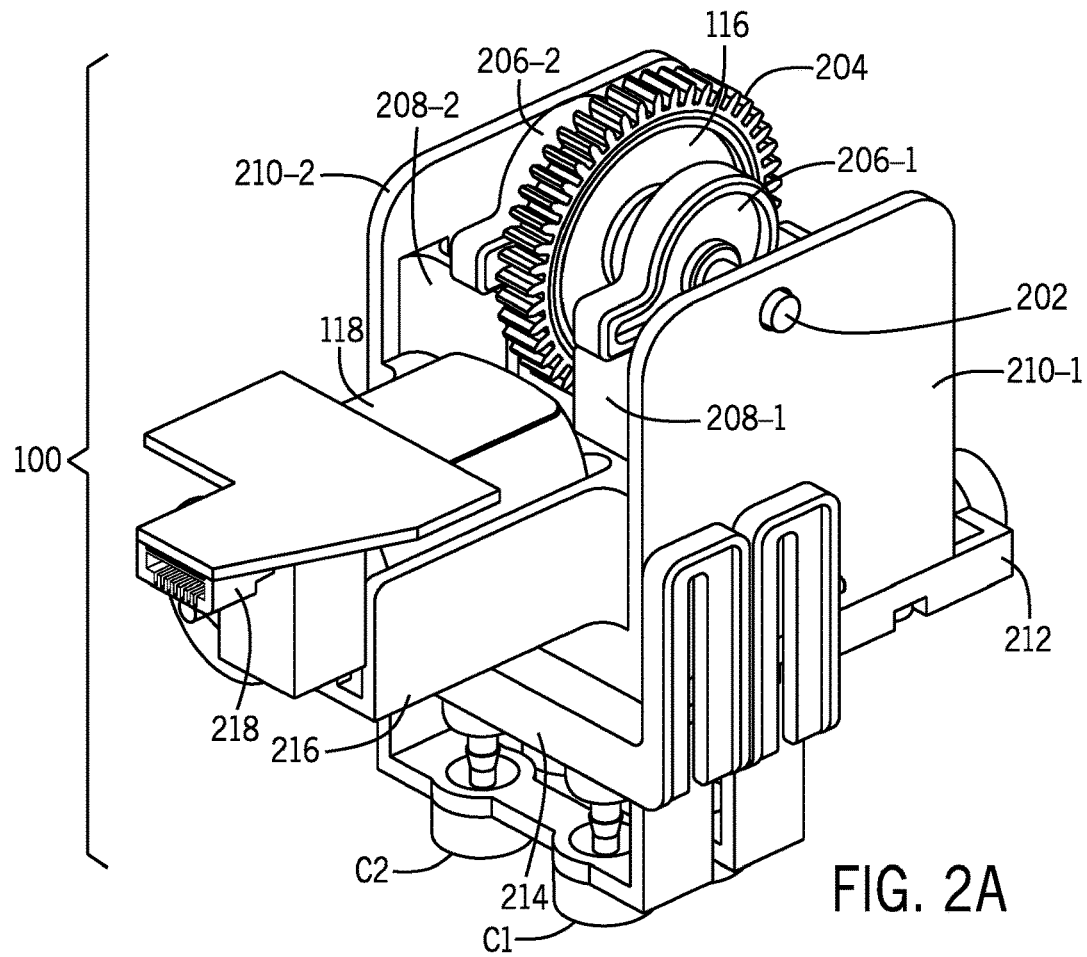
FIGS. 2A and 2B are different perspective views of a valve assembly according to some examples.
Figure 2B:
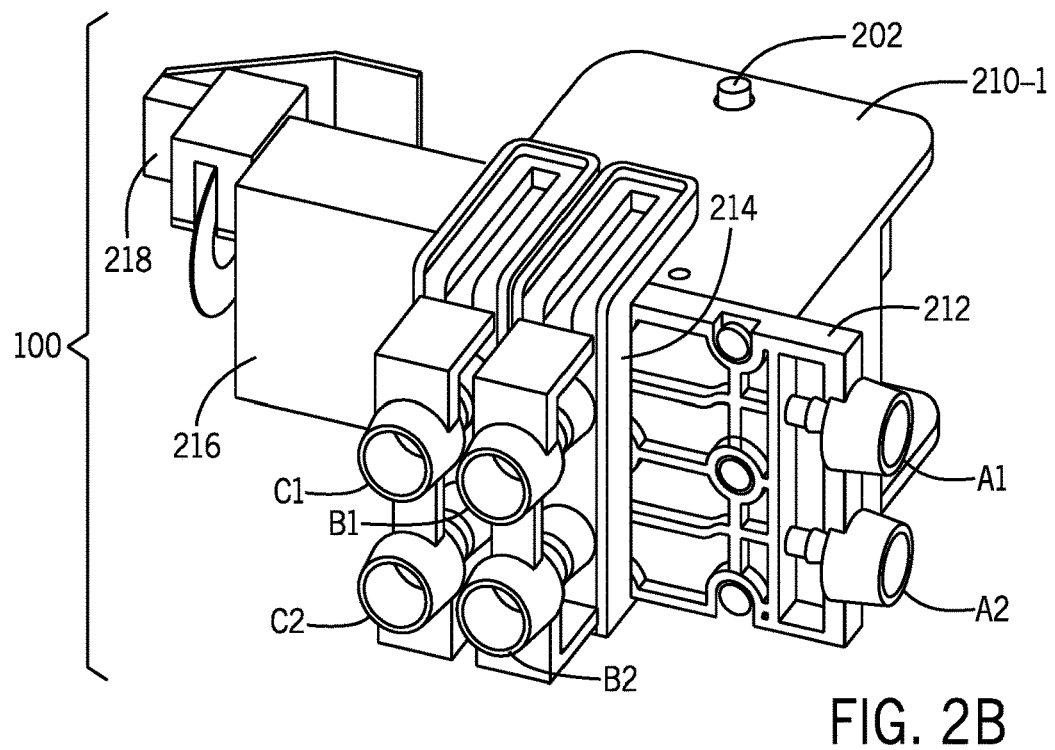

FIG. 2A is a perspective side view of the valve assembly 100 according to some examples, and FIG. 2B is a perspective bottom view of the valve assembly 100. Although FIGS. 2A and 2B depict a specific arrangement of components of the valve assembly 100, it is noted that in other examples, different components with different arrangements can be included in the valve assembly 100.

The common actuator 116 of the valve assembly 100 can include a rotatable drive gear 116 that is rotated by the motor 118 when activated. The motor 118 can rotate the drive gear 116 in each of a clockwise direction and a counter-clockwise direction. The drive gear 116 is mounted on a drive shaft 202. In examples according to FIG. 2A, the drive gear 116 has an outer teeth profile 204, which engages a driving element of the motor 118 to cause rotation of the drive gear 116. When the drive gear 116 is rotated, the drive shaft 202 is rotated with the drive gear 116. In other examples, the common actuator 116 can be implemented using a different structure for operating the valves between positions.

As further shown in FIG. 2A, rotatable cams 206-1 and 206-2 are also mounted on the drive shaft 202. The cams 206-1 and 206-2 are fixedly mounted to the drive shaft 202, such that rotation of the drive shaft 202 causes corresponding rotation of the cams 206-1 and 206-2. The cam 206-1 is depicted as resting against a stop member 208-1, and the cam 206-2 is shown as resting against a stop member 208-2. Each stop member 208-1 or 208-2 is a fixed structure that prevents further rotation of the respective cam 206-1 or 206-2. The stop member 208-1 is fixedly attached to a first side wall 210-1 of the valve assembly 100, and the stop member 208-2 is fixedly attached to a second side wall 210-2 of the valve assembly 100. As shown in each of FIGS. 2A and 2B, an opening is provided in the side wall 210-1 through which a first end portion of the drive shaft 202 extends. The side wall 210-2 similarly includes an opening through which a second end portion of the drive shaft 202 extends. The drive shaft 202 is rotatable in the openings of the side walls 210-1 and 210-2.

As further shown in FIGS. 2A and 2B, the side walls 210-1 and 210-2 along with other components of the valve assembly 100 are mounted on a support body 212. The support body 212 is further attached to a header 214. Although not shown, fluid paths are provided through the header 214 and the support body 212, to selectively interconnect port C1 with either of port A1 or port B1, depending on the position of the valve 106-1, and to selectively interconnect port C2 with either of port A2 or port B2 depending upon the position of the valve 106-2. Interconnecting ports can refer to establishing fluid communication between the ports.

Port C1 is port C of the first valve 106-1, and port C2 is port C of the second valve 106-2. Similarly, port B1 is port B of the first valve 106-1, and port B2 is port B of the second valve 106-2. Port A1 is port A of the first valve 106-1, and port A2 is port A of the second valve 106-2.

The motor 118 is supported by a motor support 216, which is attached to the side walls 210-2 and 210-1. As further shown in FIG. 2A, the motor 118 is connected to an electrical connector 218, to allow for electrical power and signals to be connected to the motor 118, to control activation and deactivation of the motor 118.

Figure 3:
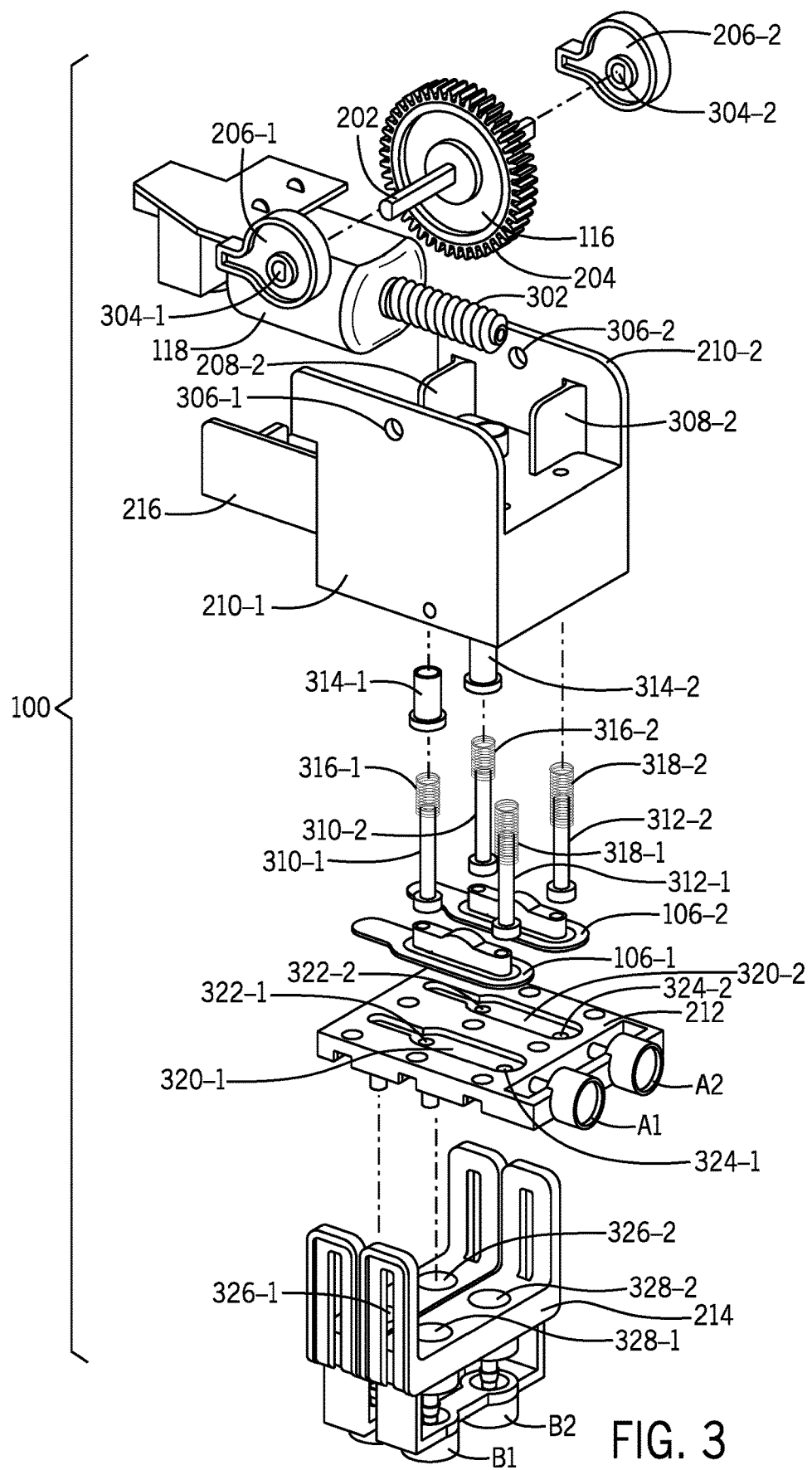
FIG. 3 is an exploded view of a valve assembly according to some examples.

FIG. 3 is an exploded view of the valve assembly 100 according to some examples. As shown in FIG. 3, the motor 118 has a drive element that can be in the form of a worm 302 that has a helical profile on its outer surface. The helical profile engages the teeth profile 204 of the drive gear 116. The worm 302 is rotated by the motor 118 in either the clockwise direction or the counter-clockwise direction, depending upon whether the motor 118 is to be actuated to move the valves from position A to position B, or vice versa. Rotation of the worm 302 causes corresponding rotation of the drive gear 116 that is mounted on the drive shaft 202.

In other examples, the motor 118 can have a different type of drive element to rotate the drive gear 116 or another type of common actuator that is operatively connected to multiple valves.

The cam 206-1 has an opening 304-1 through which the drive shaft 202 extends to mount the cam 206-1 onto the drive shaft 202. Similarly, the cam 206-2 has an opening 304-2 through which the drive shaft 202 extends to mount the cam 304-1 onto the drive shaft 202. In some examples, the openings 304-1 and 304-2 of the respective cams 206-1 and 206-2 each has a general D-shaped profile. The portions of the drive shaft 202 that pass through the openings 304-1 and 304-2 each has a corresponding generally D-shaped cross section. This allows the cams 206-1 and 206-2 to be fixedly attached to the drive shaft 202 such that rotation of the drive shaft 202 causes corresponding rotation of each of the cams 206-1 and 206-2 between a first cam position and a second cam position, where the first cam position of a respective cam corresponds to a first valve position of a respective valve, and the second cam position of the respective cam corresponds to the second valve position of the respective valve.

The opening of the drive gear 116 through which the drive shaft 202 extends similarly has a general D-shaped profile to fixedly engage to the general D-shaped cross section of the portion of the drive gear 202 that passes through the opening of the drive gear 116. As a result, rotation of the drive gear 116 by the motor 118 causes a corresponding rotation of the drive shaft 202.

The side wall 210-1 has an opening 306-1 through which the first end portion of the drive shaft 202 extends, and the side wall 210-2 has an opening 306-2 through which the drive shaft 202 extends. The openings 306-1 and 306-2 are generally circular, and the end potions of the drive shaft 202 that pass through the respective openings 306-1 and 306-2 have a generally circular cross section so that the drive shaft 202 can freely rotate in the openings 306-1 and 306-2.

As further shown in FIG. 3, the valves 106-1 and 106-2 are each implemented as a respective rocker valve. In other examples, instead of using rocker valves, other types of valves can be used.

A rocker valve is pivotable about a pivot axis between two different positions, which corresponds to position A and position B discussed above. The pivoting of each valve 106-2 or 106-1 is responsive to rotation of the respective cam 206-1 or 206-2 to a first position or to a second position. In FIG. 3, the first position of the valve 106-2 corresponds to the cam 206-2 being rotated to engage a stop member 308-2 (which causes the rocker valve 106-2 to be set to position A), while the second position corresponds to the cam 206-2 being rotated to engage the stop member 208-2 (which causes the rocker valve 106-2 to be set to position B). Although not shown, corresponding stop members similar to stop member 208-2 and 308-2 are provided for the cam 206-1.

Each respective cam is rotated to the first cam position when the respective cam engages a first stop member, and wherein the respective cam is rotated to the second cam position when the respective cam engages a second stop member.

In examples according to FIG. 3, each rocker valve 106-1 or 106-2 is associated with a pair of valve plungers that selectively engage different sides of the rocker valve to pivot the rocker valve between two different positions. The rocker valve 106-1 is associated with valve plungers 310-1 and 312-1. The valve plunger 310-1 engages a first side of the rocker valve 106-1, and the valve plunger 312-1 engages a second side of the rocker valve 106-1.

The rocker valve 106-1 is also associated with a cam plunger 314-1 and a spring 316-1 that is provided around the valve plunger 310-1. The cam plunger 314-1 is able to move longitudinally between a first position where the spring 316-1 is not compressed or is partially compressed by the cam plunger 314-1, and a second position where the cam plunger 314-1 compresses the spring 316-1 to a compressed state (that is more fully compressed than uncompressed or partially compressed state). When the spring 316-1 is compressed, the spring 316-1 pushes downwardly on an enlarged end portion of the valve plunger 310-1 to push the valve plunger 310-1 against the first side of the rocker valve 106-1.

Another spring 318-1 is provided around the valve plunger 312-1. The spring 318-1 has a length that is longer than the length of the spring 316-1. The spring 318-1 is assembled in a compressed state in the valve assembly 100.

Similarly, the rocker valve 106-2 is associated with valve plungers 310-2 and 312-2. The valve plunger 310-2 engages a first side of the rocker valve 106-2, and the valve plunger 312-2 engages a second side of the rocker valve 106-2. The rocker valve 106-2 is also associated with a cam plunger 314-2 and a spring 316-2 that is provided around the valve plunger 310-2. Another spring 318-2 is provided around the valve plunger 312-2. The spring 318-2 has a length that is longer than the length of the spring 316-2. The spring 318-2 is assembled in a compressed state in the valve assembly 100.

In some examples, the springs 316-1, 318-1 can be part of the biasing mechanism 120-1 of FIG. 1, and the springs 316-2, 318-2 can be part of the biasing mechanism 120-2 of FIG. 1.

A sealing surface of the rocker valve 106-1 engages a receptacle 320-1 in an upper surface of the support body 212, and a sealing surface of the rocker valve 106-2 engages a receptacle 320-2 in the upper surface of the support body 212. As can be seen in FIG. 3, the receptacle 320-2 has a valve seat 322-2 that is aligned with an opening 326-2 in the header 214, where the opening 326-2 leads to port C2, so that fluid communication can be performed between the opening of the valve seat 322-2 of the receptacle 320-2 and port C2. The receptacle 320-2 has another valve seat 324-2 that is aligned with an opening 328-2 in the header 214, where the opening 328-2 leads to port B2, so that fluid communication can be performed between the opening of the valve seat 324-2 of the receptacle 320-2 and port B2.

The receptacle 320-1 similarly has valve seats 322-1 and 324-1 that are aligned with corresponding openings 326-1 and 328-1 of the header 214, to communicate respectively with ports C1 and B1.

Figure 4A:
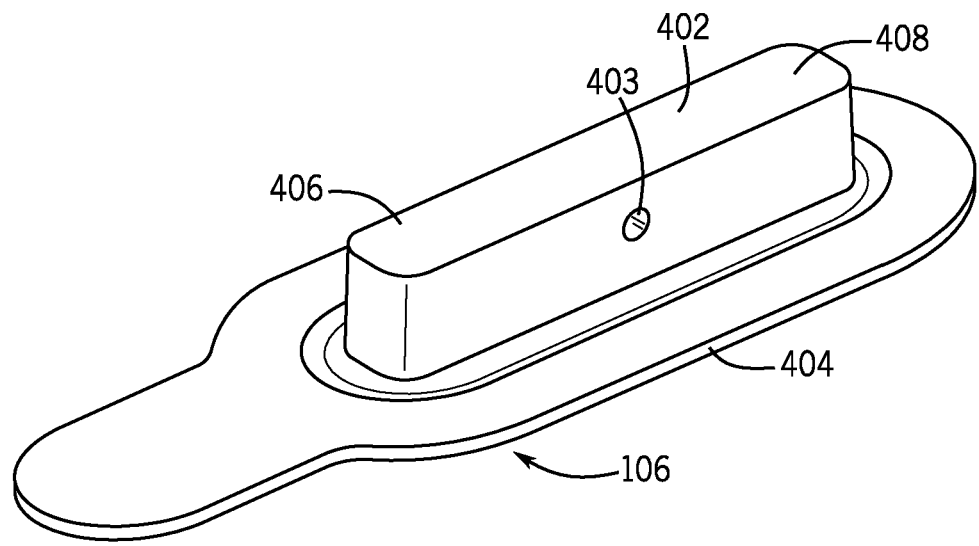
FIGS. 4A and 4B are different perspective views of a rocker valve according to some examples.
Figure 4B:
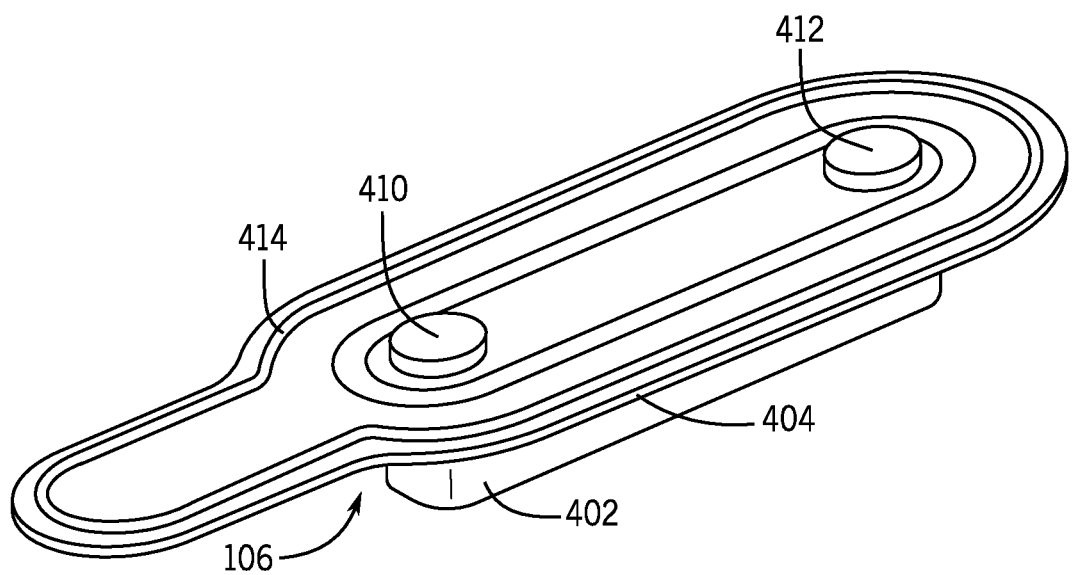

FIG. 4A is a top perspective view of a rocker valve 106, which can be the rocker valve 106-1 or 106-2 depicted in FIG. 3. FIG. 4B is a bottom perspective view of the rocker valve 106.

The rocker valve 106 includes a valve body 404 and a rocker 402 formed on an upper surface of the valve body 404. The rocker 402 can be formed of a material selected from among plastic, nylon, acetyl, polyphenylene oxide, a metal, and so forth. The valve body 404 can be formed of a flexible material, such as an elastomeric material or any other material that is flexible. The upper surface of the valve body 402 has a first contact point 406 against which a valve plunger 310-1 or 310-2 (FIG. 3) is engaged, and a second contact point 408 against which a valve plunger 312-1 or 312-2 (FIG. 3) is engaged. Depending upon which of the valve plungers is pushing down on either the contact point 406 or 408 of the rocker 402, the valve body 404 can be pivoted about a pivot axis (which extends through an opening 403 of the rocker 402) to one side or to the other side, which causes sealing engagement against either valve seat 322 or 324 of the respective receptacle 320 (320 can refer to either 320-1 or 320-2 in FIG. 3, 322 can refer to either 322-1 or 322-2 in FIG. 3, 324 can refer to either 324-1 or 324-2 in FIG. 3). Each valve seat 322 or 324 has an opening. Thus, when the rocker valve 106 is disengaged from the respective valve seat 322 or 324, fluid can flow through the opening of the respective valve seat. However, when the rocker valve 106 is sealingly engaged to the respective valve seat 322 or 324, fluid is blocked from passing through the opening of the valve seat.

As shown in FIG. 4B, a bottom surface of the valve body 404 includes a face seal 410 and a face seal 412, which, depending upon to which side the rocker valve 106 is pivoted, can seal valve seat 322 or 324 of the corresponding receptacle 320. As further shown in FIG. 4B, an outer seal 414 is provided around a circumference of the lower surface of the valve body 404. When the rocker valve 106 is engaged with the corresponding receptacle 320 of FIG. 3, the outer seal 414 seals around the receptacle 320 to prevent fluid in the receptacle from leaking out of the receptacle.

As further shown in FIG. 4A, the rocker 402 has a through-hole through which a shaft can be passed. The rocker valve 106 can pivot about the shaft that is passed through the through-hole 403.

Figure 5:
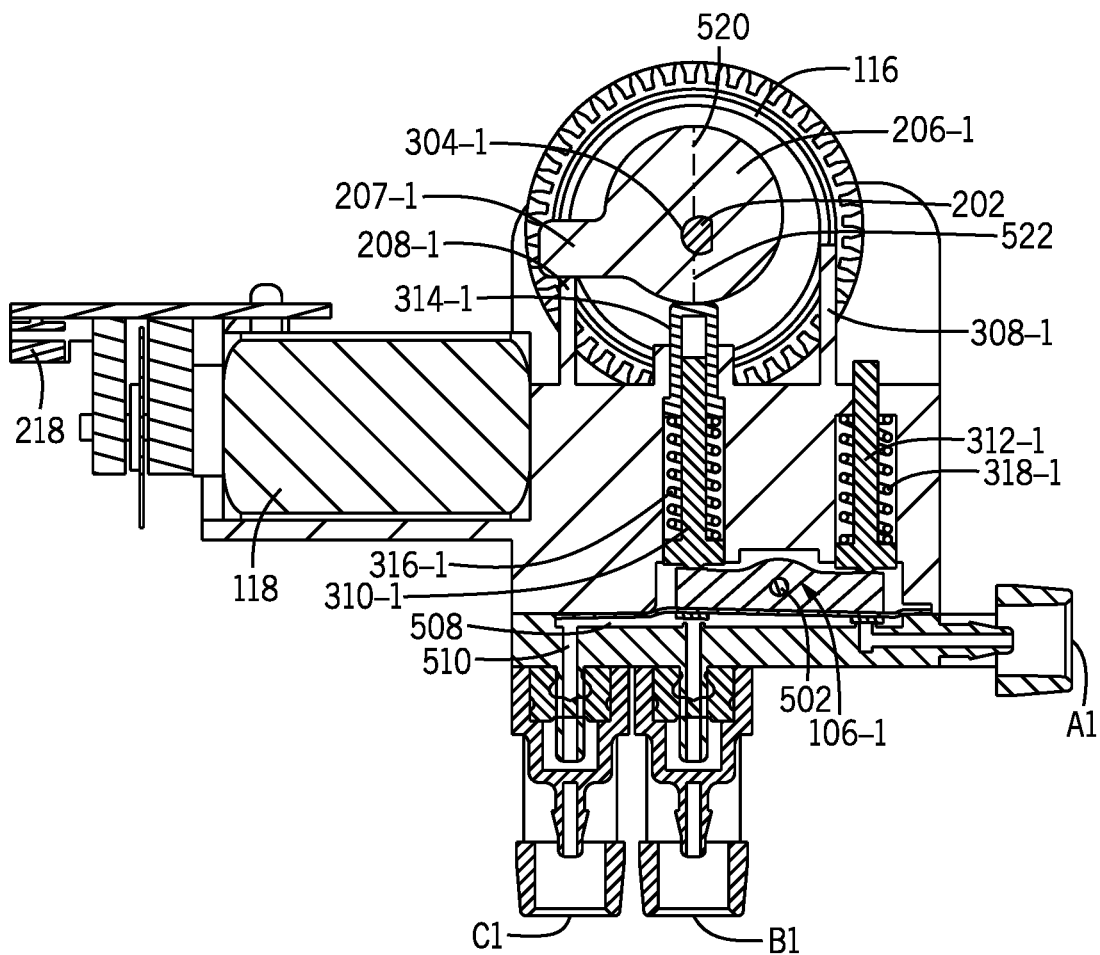
FIGS. 5-8 illustrate different states of a valve assembly according to some examples.

FIG. 5 shows a sectional side view of the valve assembly 100 according to some examples, in which the cam 206-1 is visible. The cam 206-1 is shown in a position where a protrusion 207-1 of the cam 206-1 is engaged to the stop member 208-1. In the position shown in FIG. 5, the spring 318-1 around the valve plunger 312-1 is compressed, but the spring 316-1 around the valve plunger 310-1 is not compressed.

In some examples, the spring 318-1 can have a longer length than the spring 316-1. Also, the spring 318-1 can have a lower spring rate than the spring 316-1. Since the spring 316-1 is shorter in length than the spring 318-1, when the cam 206-1 is rotated such that the protruding portion 207-1 of the cam 206-1 engages the stop member 208-1, the spring 316-1 is not compressed (or is partially compressed), but the spring 318-1 is compressed, which causes the valve plunger 312-1 to push downwardly on the right side of the rocker valve 106-1.

Figure 6:
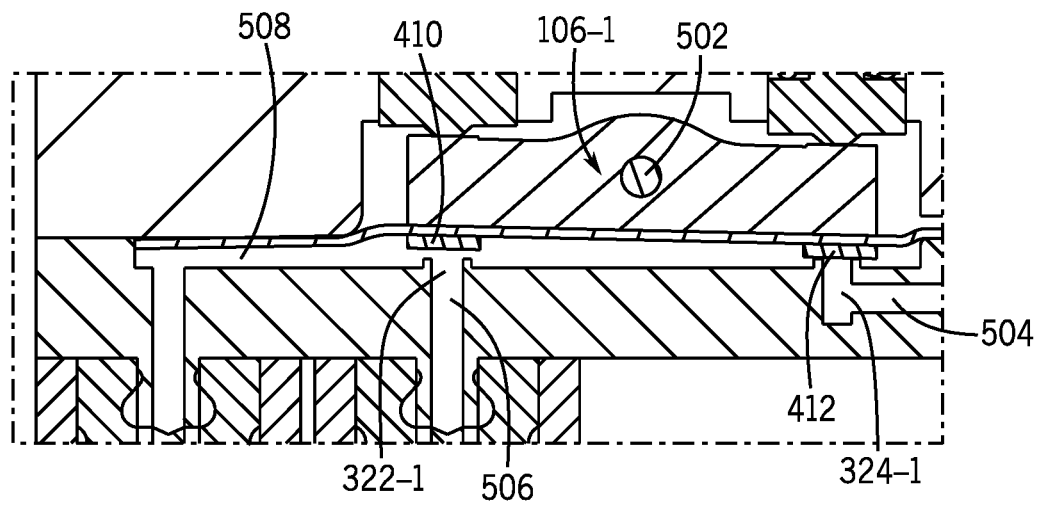

As a result, in the view of FIG. 5, the right side of the rocker valve 106-1 is pivoted downwardly about shaft 502 that passes through the through-hole 403 (FIG. 4A) of the rocker 402 of the rocker valve 106-1. FIG. 6 shows an enlarged view of a portion of the valve assembly 100 that includes the rocker valve 106-1 in the position shown in FIG. 5. When the right side of the rocker valve 106-1 is pivoted downwardly, the face seal 412 of the rocker valve 106-1 is engaged to valve seat 324-1 of the receptacle 320-1 (FIG. 3). The opening of the valve seat 324-1 leads to a flow conduit 504 that is in fluid communication with port A1. Thus, in the position of the rocker valve 106-1 shown in FIGS. 5 and 6, the rocker valve 106-1 seals against the valve seat 324-1, such that port A1 is sealed, i.e., port A1 is not in fluid communication with port C1.

As further shown in FIG. 6, the left side of the rocker valve 106-1 is pivoted upwardly, so that the face seal 410 is lifted away from the valve seat 322-1 of the receptacle 320-1 (FIG. 3). The valve seat 322-1 is at the end of a fluid conduit 506 that leads to port B1. When the face seal 410 is lifted upwardly away from the valve seat 322-1, the fluid conduit 506 that leads to port B1 is in communication with fluid channel 508 that leads to a fluid conduit 510 that is in communication with port C1. As a result, port B1 is in communication with port C1 in the position of the rocker valve 106-1 shown in FIGS. 5 and 6.

As further shown in FIG. 5, the opening 304-1 of the cam 206-1 through which the drive shaft 202 extends is not centrally located, but is offset to one side. As a result, the distance (520) from the opening 304-1 to one side of the cam 206-1 is longer than the distance (522) from the opening 304-1 to the other side of the cam 206-1. As a result of the offset location of the opening 304-1, when the cam 206-1 is rotated to the position shown in FIG. 5, the cam plunger 314-1 is pushed upwardly by the spring 316-1 so that the spring 316-1 is uncompressed or partially compressed.

The force applied by the cam plunger 314-1 or 314-2 against the cam 206-1 or 206-2, respectively, is through the center of the cam and the drive shaft 202 (i.e., through the center of the cam's rotation), which can reduce the risk for the valve to change state.

Figure 7:
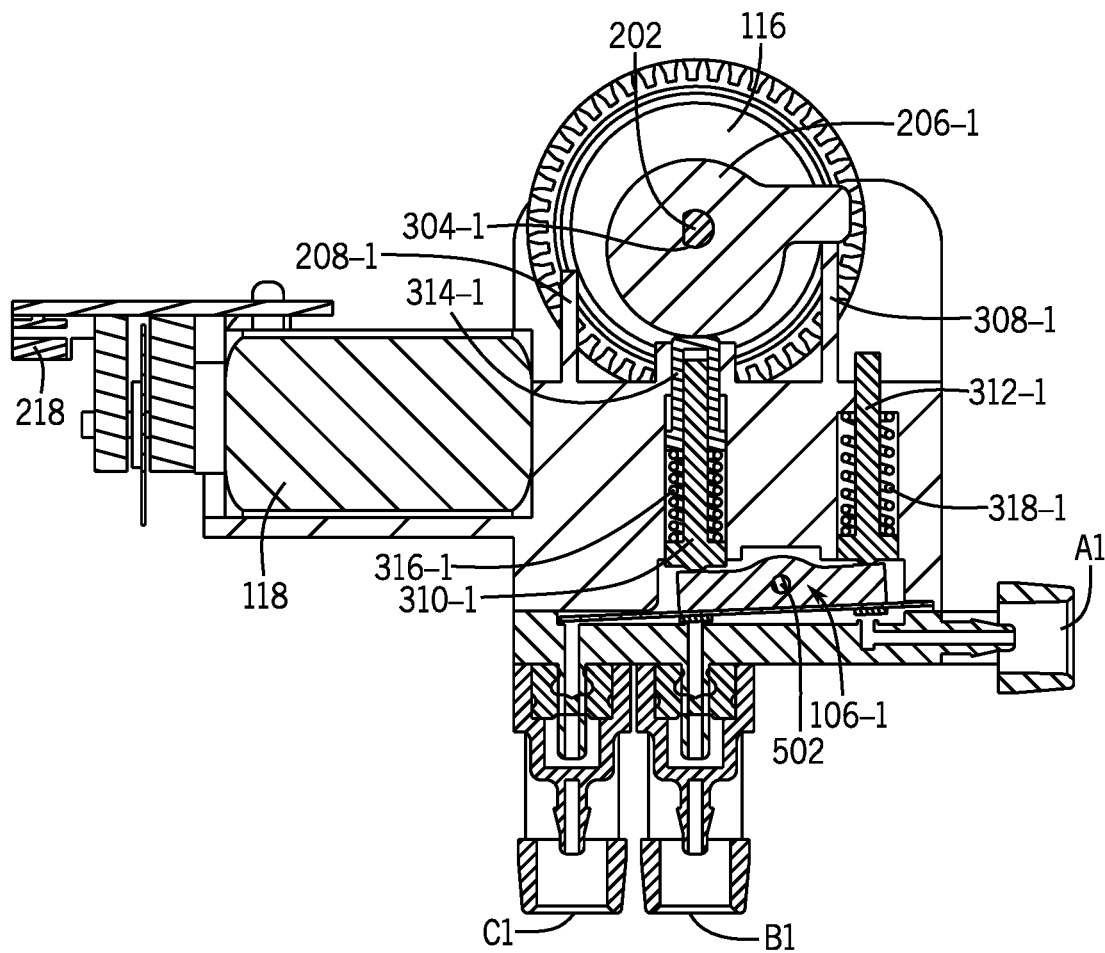
Figure 8:
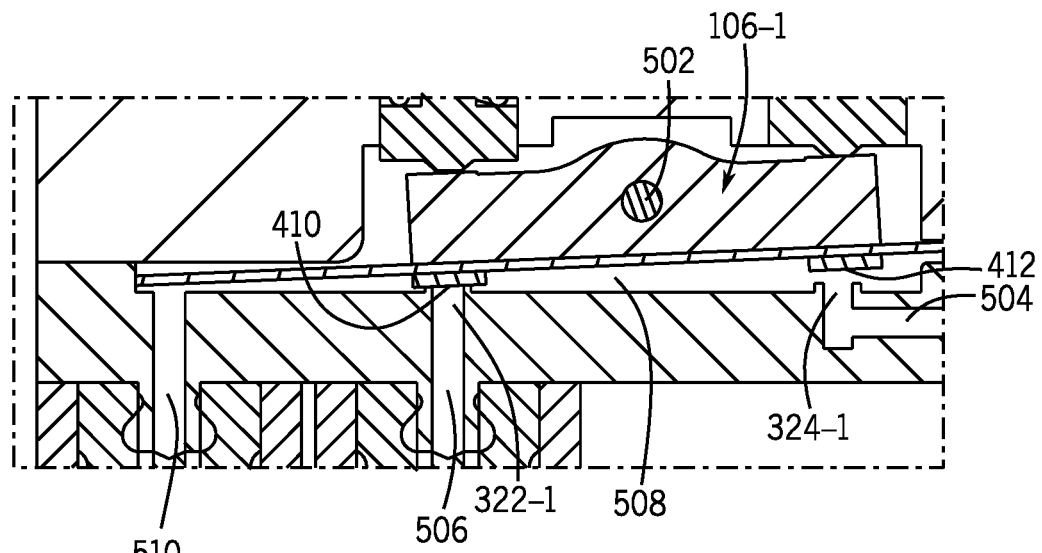

However, as shown in FIGS. 7 and 8, when the cam 206-1 is rotated such that the protruding portion 207-1 engages the other stop member 308-1, the cam 206-1 pushes downwardly on the cam plunger 314-1, which compresses the spring 316-1. Since the spring 316-1 has a higher spring rate (i.e., is stiffer) than the spring 318-1, this causes greater force to be applied by the spring 316-1 against the valve plunger 310-1, which pivots the rocker valve 106-1 such that its left side is pushed downwardly, and its right side is lifted. As a result, the opening of the valve seat 322-1 leading to port B1 is sealed, but the opening of the valve seat 324-1 leading to port A1 is unsealed, so that fluid communication can occur between port A1 and port C1.

Each spring 318-1 or 318-2 having a first spring rate is to bias the respective rocker valve to position B, and each spring 316-1 or 316-2 having a second, different spring rate is to bias the respective rocker valve to position A.

Figure 9:
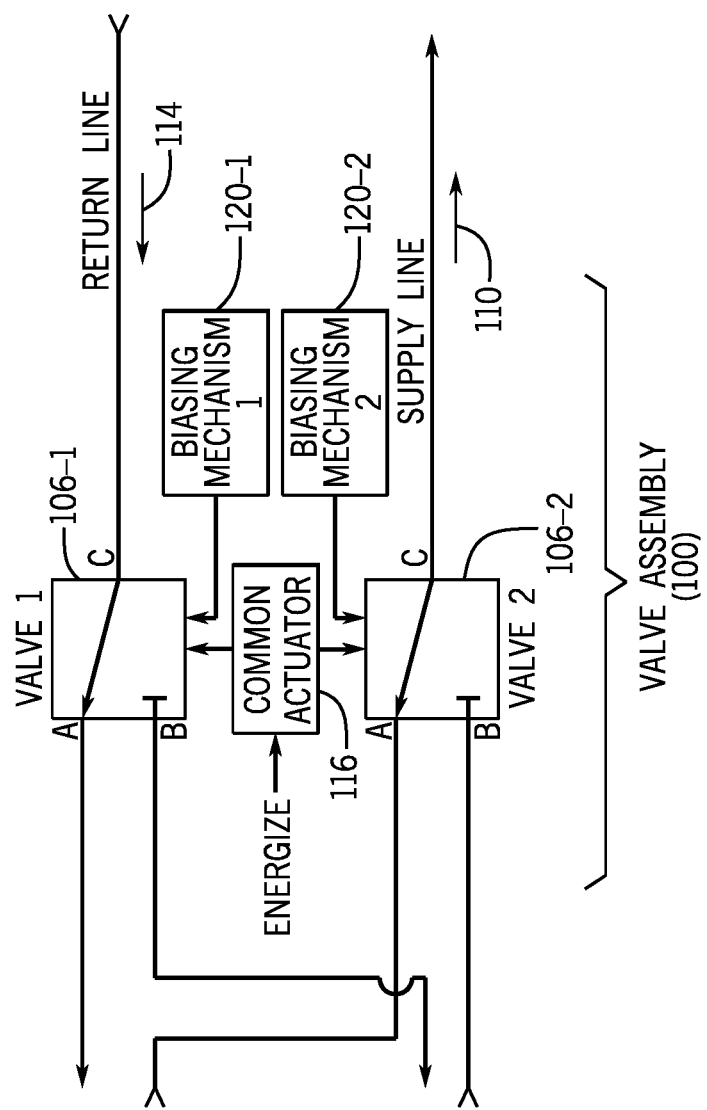
FIG. 9 is a block diagram of a valve assembly according to some examples.

FIG. 9 is the same view of FIG. 1, except that the fluid sources 102-A and 102-B and the fluid ejection device 104 of FIG. 1 are omitted in FIG. 8. Moreover, the motor 118 shown in FIG. 1 is omitted in FIG. 8. In FIG. 8, the common actuator 116 receives an energize input for controlling the valves 106-1 and 106-2. The energize input can include the output of a motor (such as the motor 118 of FIG. 1), electrical energy, or any other type of energy that is able to cause the common actuator 116 to change settings of the valves 106-1 and 106-2.

Figure 10:
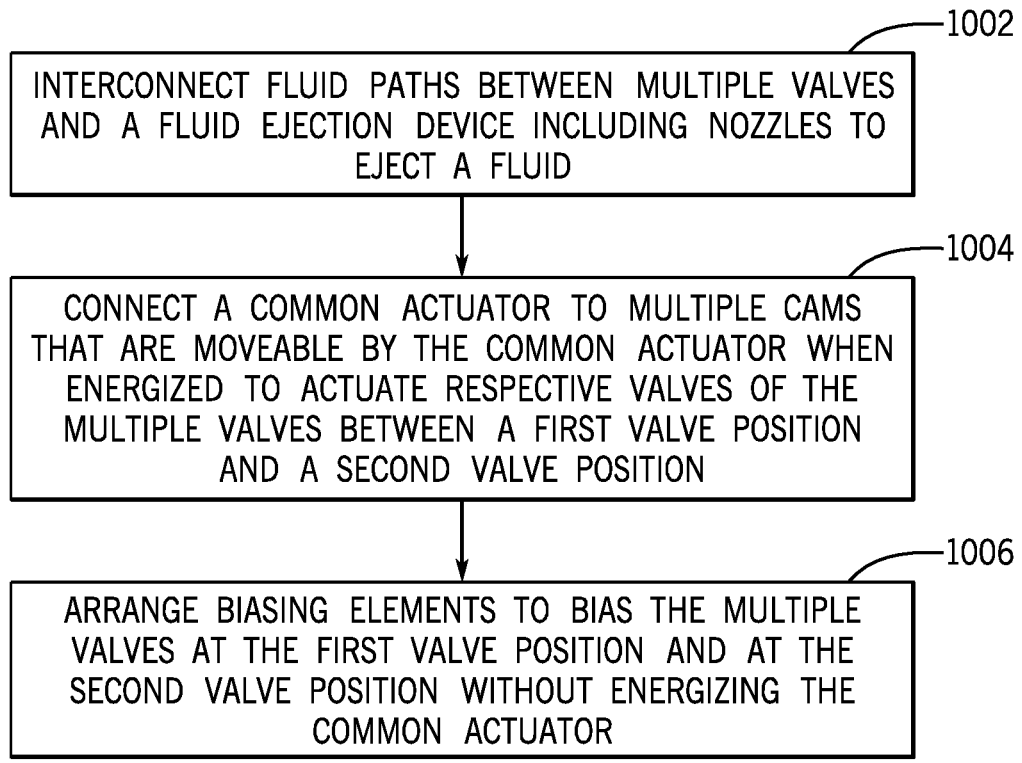
FIG. 10 is a flow diagram of a process of forming a fluid delivery system according to further examples.

FIG. 10 is a flow diagram of a process of forming a fluid delivery system according to some examples. The process of FIG. 10 includes interconnecting (at 1002) fluid paths between multiple valves and a fluid ejection device including nozzles to eject a fluid. The process connects (at 1004) a common actuator to multiple cams that are moveable by the common actuator when energized to actuate respective valves of the multiple valves between a first valve position and a second valve position. The process arranges (at 1006) biasing elements (such as the springs 316-1, 318-1, 316-2, and 316-2 of FIG. 3) to bias the multiple valves at the first valve position and at the second valve position without energizing the common actuator.

As noted above, in some examples, the biasing elements can cooperate with frictional forces in a motor (e.g., the motor 118 of FIG. 1) to maintain each valve at position A or position B. The frictional forces of the motor are able to keep moveable member(s) of the motor in position even though the motor is deactivated.

Figure 11:
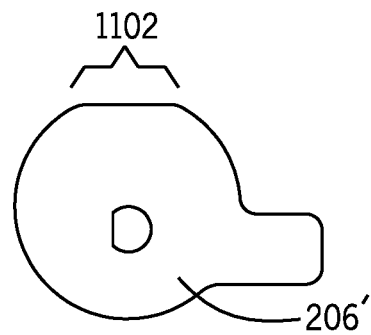
FIG. 11 illustrates a cam according to alternative examples.

In other examples, instead of relying on frictional forces of a motor, a modified cam design can be used. As shown in FIG. 11, a cam 206' has a flat portion 1102, where the flat portion engages a cam plunger 314-1 or 314-2 when the cam 206' is in the position shown in FIG. 11. The engagement of the flat portion 1102 and the cam plunger 314-1 or 314-2 allows the cam 206' to stay in position, until a force is applied to cause rotation of the cam 206'.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A valve assembly for a fluid ejection device, comprising:
    a plurality of valves to control fluid supply from a plurality of fluid sources to the fluid ejection device, each respective valve of the plurality of valves actuatable between a first valve position to provide fluid communication through a first fluid path between a first fluid source of the plurality of fluid sources and the fluid ejection device, and a second valve position to provide fluid communication through a second fluid path between a second fluid source of the plurality of fluid sources and the fluid ejection device;
    a common actuator to, when energized, control movement of the plurality of valves; and
    a plurality of biasing mechanisms, each respective biasing mechanism of the plurality of biasing mechanisms to maintain the respective valve at each of the first valve position and the second valve position without energizing the common actuator.

2. The valve assembly of claim 1, wherein the common actuator is operatively connected to a plurality of cams that are moveable to actuate corresponding valves of the plurality of values between the first valve position and the second valve position.

3. The valve assembly of claim 2, wherein each respective cam of the plurality of cams is rotatable between a first cam position and a second cam position, the first cam position of the respective cam corresponding to the first valve position of the respective valve, and the second cam position of the respective cam corresponding to the second valve position of the respective valve.

4. The valve assembly of claim 3, further comprising a first stop member and a second stop member, wherein the respective cam is rotated to the first cam position when the respective cam engages the first stop member, and wherein the respective cam is rotated to the second cam position when the respective cam engages the second stop member.

5. The valve assembly of claim 3, wherein the respective cam includes a flat portion to engage a surface of a cam plunger when the respective cam is rotated to one the first and second cam positions, the engagement of the flat portion of the respective cam to the surface of the cam plunger assists in maintaining the respective cam at the first cam position or the second cam position without energizing the common actuator.

6. The valve assembly of claim 1, further comprising a motor, wherein friction in the motor is to assist in maintaining the respective valve at each of the first valve position and the second valve position without energizing the common actuator.

7. The valve assembly of claim 1, wherein each valve of the plurality of valves is a rocker valve that pivots between the first valve position and the second valve position.

8. The valve assembly of claim 1, wherein the plurality of biasing mechanisms comprise springs.

9. The valve assembly of claim 8, wherein each biasing mechanism of the plurality of biasing mechanisms comprises springs having different spring rates, wherein a first spring having a first spring rate is to bias the respective valve to the first valve position, and a second spring having a second, different spring rate is to bias the respective valve to the second valve position.

10. A fluid delivery system comprising:
    a fluid ejection device comprising nozzles to eject a fluid; and
    a valve assembly to control a supply of the fluid to the fluid ejection device selectively from one of a plurality of fluid sources, the valve assembly comprising:
        a plurality of valves each movable between a first valve position to select a first fluid source of the plurality of fluid sources, and a second valve position to select a second fluid source of the plurality of fluid sources;
        a common actuator comprising a motor to, when the motor is energized, control movement of the plurality of valves; and
        a plurality of biasing mechanisms, each respective biasing mechanism of the plurality of biasing mechanisms to maintain the respective valve at each of the first valve position and the second valve position without energizing the motor.

11. The fluid delivery system of claim 10, wherein the common actuator further comprises a rotatable drive gear to be rotated by the motor responsive to energizing the motor, a drive shaft on which the rotatable drive gear is mounted, and a plurality of cams mounted on the drive shaft, the plurality of cams rotatable with rotation of the rotatable drive gear, and the plurality of cams when rotated actuating corresponding valves of the plurality of valves.

12. The fluid delivery system of claim 11, wherein each valve of the plurality of valves is pivotable between the first valve position and the second valve position responsive to rotation of a respective cam of the plurality of cams.

13. The fluid delivery system of claim 11, further comprising a plurality of cam plungers that are moved in response to rotation of respective cams of the plurality of cams.

14. A method of forming a fluid delivery system, comprising:
   interconnecting fluid paths between a plurality of valves and a fluid ejection device comprising nozzles to eject a fluid;
   connecting a common actuator to a plurality of cams that are moveable by the common actuator when energized to actuate respective valves of the plurality of valves between a first valve position and a second valve position; and
   arranging biasing elements to bias the plurality of valves at the first valve position and at the second valve position without energizing the common actuator.

15. The method of claim 14, wherein the biasing elements comprise springs having different spring rates, wherein a first spring having a first spring rate is to bias a respective valve of the plurality of valves to the first valve position, and a second spring having a spring rate is to bias the respective valve to the second valve position.

\* \* \* \* \*